US011661327B2

(12) United States Patent
Bergmann et al.

(10) Patent No.: US 11,661,327 B2
(45) Date of Patent: May 30, 2023

(54) SMART INVENTORY MANAGEMENT SYSTEM FOR A DISPENSING AND BLEND-IN-CUP BEVERAGE PLATFORM

(71) Applicant: Fresh Blends Ltd., Nassau (BS)

(72) Inventors: Dennies Bergmann, Hannover (DE);
Marc Hildmann, Hannover (DE);
Marc-Alexander Lange, Boca Raton, FL (US)

(73) Assignee: Fresh Blends Ltd., Nassau (BS)

( * ) Notice: Subject to any disclaimer, the term of this patent is extended or adjusted under 35 U.S.C. 154(b) by 0 days.

(21) Appl. No.: 17/550,902

(22) Filed: Dec. 14, 2021

(65) Prior Publication Data

US 2022/0185651 A1   Jun. 16, 2022

Related U.S. Application Data

(60) Provisional application No. 63/126,222, filed on Dec. 16, 2020.

(51) Int. Cl.
*B67D 1/08* (2006.01)
*B67D 1/10* (2006.01)
(Continued)

(52) U.S. Cl.
CPC ......... *B67D 1/0888* (2013.01); *B67D 1/0801* (2013.01); *B67D 1/10* (2013.01);
(Continued)

(58) Field of Classification Search
CPC ...... B67D 1/0888; B67D 1/0801; B67D 1/10; B67D 2001/0093; B67D 2001/0811; G06K 7/10297; G07F 13/065
See application file for complete search history.

(56) References Cited

U.S. PATENT DOCUMENTS 5,361,070 A   11/1994   McEwan
5,380,991 A   1/1995   Valencia et al.
(Continued)

FOREIGN PATENT DOCUMENTS

DE   202020105834 U1   10/2020
EP   3265421 B1   2/2020
WO   WO-2022073978 A1 *   4/2022

OTHER PUBLICATIONS

Cosgrove, Johanna. "RFID for Beverages" Beverage Industry, Feb. 1, 2005, 3 pages, retrieved from URL: https://www.bevindustry.com/articles/83765-rfid-for-beverages.
(Continued)

*Primary Examiner* — Donnell A Long
(74) *Attorney, Agent, or Firm* — McDermott Will & Emery LLP

(57) ABSTRACT

A smart inventory management system is described for a dispensing and blend-in-cup beverage platform including a container having an information tag that is configured to store unique information specific to a particular product, a reader configured to read the stored information from the information tag, a control board configured to host a software based decision engine which is configured to interpret the information specific to a particular product and to control one or more system components based at least in part on the information, a pump controlled by the control board and configured to pump beverage concentrates out of the containers in order to dispense the beverage concentrate into a beverage holder, and a check valve located between an opening on the container and the pump, the check valve configured to provide backflush prevention of foreign solutions into the container.

15 Claims, 9 Drawing Sheets

(51) Int. Cl.
*G06K 7/10* (2006.01)
*B67D 1/00* (2006.01)

(52) U.S. Cl.
CPC .. *G06K 7/10297* (2013.01); *B67D 2001/0093* (2013.01); *B67D 2001/0811* (2013.01)

(56) References Cited

U.S. PATENT DOCUMENTS

| | | |
|---|---|---|
| 5,677,927 A | 10/1997 | Fullerton et al. |
| 5,687,169 A | 11/1997 | Fullerton |
| 5,706,661 A | 1/1998 | Frank |
| 5,711,160 A | 1/1998 | Namisniak et al. |
| 5,727,153 A | 3/1998 | Powell |
| 5,798,694 A | 8/1998 | Reber et al. |
| 5,832,035 A | 11/1998 | Fullerton |
| 5,942,977 A | 8/1999 | Palmer et al. |
| 5,955,969 A | 9/1999 | D'Hont |
| 5,990,794 A | 11/1999 | Alicot et al. |
| 6,037,879 A | 3/2000 | Tuttle |
| 6,079,315 A | 6/2000 | Beaulieu et al. |
| 6,177,903 B1 | 1/2001 | Fullerton et al. |
| 6,195,006 B1 | 2/2001 | Bowers et al. |
| 6,218,979 B1 | 4/2001 | Barnes et al. |
| 6,226,619 B1 | 5/2001 | Halperin et al. |
| 6,294,997 B1 | 9/2001 | Paratore et al. |
| 6,429,768 B1 | 8/2002 | Flick |
| 6,446,049 B1 | 9/2002 | Janning et al. |
| 6,451,154 B1 | 9/2002 | Grabau et al. |
| 6,491,217 B2 | 12/2002 | Catan |
| 6,507,279 B2 | 1/2003 | Loof |
| 6,606,938 B2 | 8/2003 | Taylor |
| 6,607,762 B2 | 8/2003 | Lazaris et al. |
| 6,655,260 B2 | 12/2003 | Lazaris et al. |
| 6,693,511 B1 | 2/2004 | Seal |
| 6,693,539 B2 | 2/2004 | Bowers et al. |
| 6,705,591 B2 | 3/2004 | Decler |
| 6,848,602 B2 | 2/2005 | Decler |
| 6,902,144 B2 | 6/2005 | Decler |
| 6,916,007 B2 | 7/2005 | Decler et al. |
| 6,962,275 B2 | 11/2005 | Decler et al. |
| 6,978,800 B2 | 12/2005 | Decler et al. |
| 6,982,640 B2 | 1/2006 | Lindsay et al. |
| 7,013,933 B2 | 3/2006 | Sher et al. |
| 7,163,022 B2 | 1/2007 | Whall |
| 7,165,488 B2 | 1/2007 | Bragg et al. |
| 7,322,520 B2 | 3/2008 | Bragg et al. |
| 7,347,138 B2 | 3/2008 | Bragg et al. |
| 7,352,771 B2 | 4/2008 | Garber |
| 7,360,418 B2 | 4/2008 | Pelovitz |
| 7,377,162 B2 | 5/2008 | Lazaris |
| 7,394,375 B2 | 7/2008 | Johnson |
| 7,398,726 B2 | 7/2008 | Streeter et al. |
| 7,469,472 B2 | 12/2008 | Decler et al. |
| 7,488,446 B2 | 2/2009 | Meyer et al. |
| 7,490,638 B2 | 2/2009 | Sher et al. |
| 7,513,192 B2 | 4/2009 | Sullivan et al. |
| 7,577,596 B2 | 8/2009 | Antonuk et al. |
| 7,617,132 B2 * | 11/2009 | Reade .................. G06Q 20/208 |
| | | 705/26.61 |
| 7,631,660 B2 | 12/2009 | Decler et al. |
| 7,640,845 B2 | 1/2010 | Woodnorth et al. |
| 7,647,954 B2 | 1/2010 | Garber et al. |
| 7,695,020 B2 | 4/2010 | Schmidt |
| 7,708,025 B2 | 5/2010 | Johnson |
| 7,841,357 B2 | 11/2010 | Rankin |
| 7,954,374 B2 | 6/2011 | Rankin |
| 7,954,515 B2 | 6/2011 | Gerst |
| 8,091,735 B2 | 1/2012 | Girard et al. |
| 8,104,642 B2 | 1/2012 | Bambrick et al. |
| 8,151,694 B2 | 4/2012 | Jacobs et al. |
| 8,361,527 B2 | 1/2013 | Winkler et al. |
| RE44,310 E | 6/2013 | Chadbourne et al. |
| 8,495,949 B2 | 7/2013 | Tinkler et al. |
| 8,516,948 B2 | 8/2013 | Zimmerman et al. |
| 8,573,114 B2 | 11/2013 | Huang et al. |
| 8,590,753 B2 | 11/2013 | Marina et al. |
| 8,609,170 B2 | 12/2013 | Tinkler et al. |
| 8,667,892 B2 | 3/2014 | Cominelli et al. |
| 8,708,195 B1 | 4/2014 | Duran |
| 8,740,020 B2 | 6/2014 | Marina et al. |
| 8,757,222 B2 | 6/2014 | Rudick et al. |
| 8,808,775 B2 | 8/2014 | Novak et al. |
| 8,881,948 B1 | 11/2014 | Lassota |
| 8,945,091 B2 | 2/2015 | Williams et al. |
| 8,989,895 B2 | 3/2015 | Holman et al. |
| 9,279,530 B2 | 3/2016 | Schmidt |
| 9,355,096 B1 * | 5/2016 | Brahmbhatt ........... G06Q 50/12 |
| 9,506,590 B2 | 11/2016 | Wilhelm et al. |
| 9,695,030 B2 | 7/2017 | Walker |
| 9,721,446 B1 * | 8/2017 | Hanis .................... G16H 20/60 |
| 9,879,808 B2 | 1/2018 | Williams et al. |
| 10,046,324 B2 | 8/2018 | Rankin et al. |
| 10,081,194 B2 | 9/2018 | Burdge et al. |
| 10,307,583 B2 | 6/2019 | Williams et al. |
| 10,617,861 B2 | 4/2020 | Wilhelm |
| 10,627,151 B2 | 4/2020 | Downs et al. |
| 10,632,297 B2 | 4/2020 | Gerst et al. |
| 10,668,265 B2 | 6/2020 | Burdge |
| 10,711,931 B2 | 7/2020 | Downs et al. |
| 10,828,481 B2 | 11/2020 | Truong et al. |
| 10,837,581 B2 | 11/2020 | Williams et al. |
| 10,837,583 B2 | 11/2020 | Johnson et al. |
| 10,871,250 B2 | 12/2020 | Williams et al. |
| 2005/0087255 A1 * | 4/2005 | Humphrey ............ G07F 7/025 |
| | | 141/94 |
| 2006/0043101 A1 | 3/2006 | Bhimani et al. |
| 2008/0029541 A1 | 2/2008 | Wallace et al. |
| 2008/0073376 A1 * | 3/2008 | Gist ...................... B67D 1/0043 |
| | | 222/145.5 |
| 2008/0189078 A1 * | 8/2008 | Vok ...................... B67D 1/0831 |
| | | 702/188 |
| 2009/0070234 A1 * | 3/2009 | Peters .................. B67D 1/0041 |
| | | 705/26.1 |
| 2011/0073618 A1 | 3/2011 | Anderson et al. |
| 2012/0035761 A1 * | 2/2012 | Tilton .................. B67D 1/0057 |
| | | 700/239 |
| 2015/0374025 A1 * | 12/2015 | Evans ...................... A23L 2/04 |
| | | 99/495 |
| 2015/0375984 A1 * | 12/2015 | Arcand ................ G07F 13/065 |
| | | 141/94 |
| 2016/0022539 A1 * | 1/2016 | Daines .................... A61M 5/30 |
| | | 604/416 |
| 2018/0022593 A1 * | 1/2018 | Feola .................... B67D 1/0078 |
| | | 700/232 |
| 2019/0354992 A1 * | 11/2019 | Duckett ............... G06Q 30/018 |
| 2020/0265446 A1 * | 8/2020 | Vargas ................. G06Q 10/087 |
| 2021/0117950 A1 * | 4/2021 | Bentsur .................. G01G 19/08 |
| 2022/0355971 A1 * | 11/2022 | Bach .................... B67D 1/0835 |

OTHER PUBLICATIONS

International Search Report and Written Opinion dated Apr. 8, 2022 in International Application No. PCT/US2021/063366.

* cited by examiner

SMART INVENTORY MANAGEMENT SYSTEM FOR A DISPENSING AND BLEND-IN-CUP BEVERAGE PLATFORM

CROSS-REFERENCE TO RELATED APPLICATIONS

The present application claims priority to U.S. Provisional Patent Application No. 63/126,222 entitled "SMART INVENTORY MANAGEMENT SYSTEM FOR A DISPENSING AND BLEND-IN-CUP BEVERAGE PLATFORM" and filed on Dec. 16, 2020, the disclosure of which is hereby incorporated by reference in its entirety for all purposes.

FIELD OF THE DISCLOSURE

The present disclosure is directed to a smart inventory and sanitation management system for a blend-in-cup beverage dispensing platform.

BACKGROUND

Self-serve beverage platforms are widely used to dispense drinks in a variety of establishments. Fast-food outlets, roadside convenience stores, fueling stations, and cafeterias are examples of locations involving high volume consumption of frozen, blended and dispensed beverages. Because of the high volume, these self-serve devices must have sophisticated systems for storing and delivering the components expected in a freshly made beverage. As such, there is a need for smart and automated inventory and cleaning management for such beverage platforms.

SUMMARY

A smart inventory management system for a dispensing and blend-in-cup beverage platform is described herein. The system includes at least one container having an information tag that is configured to store unique information specific to a particular product, a reader located proximate the container, the reader configured to read the stored information from the information tag, a control board configured to host a software based decision engine, the software based decision engine configured to interpret the information specific to a particular product and to control one or more system components based at least in part on the information, at least one of pump controlled by the control board and configured to pump beverage concentrates out of the containers in order to dispense the beverage concentrate into a beverage holder based on the information stored on the information tag, and at least one check valve located between an opening on the container and the pump, the check valve configured to provide backflush prevention of foreign solutions into the container.

In some embodiments, the information specific to a particular product comprises at least one of: beverage product composition parameters, beverage product handling parameters, beverage production date parameters, beverage product shelf life parameters, and beverage product dispensing parameters.

In some embodiments, the information tag is one of a Radio Frequency Identification (RFID) tag, a Quick Response (QR) code, or a bar code and the wireless exciter is an Radio Frequency Identification (RFID) exciter, a Quick Response (QR) code scanner, a bar code scanner, or a camera.

In some embodiments, the control of one or more system components comprises at least one of: managing system inventory, adjusting pump parameters, adjusting dispensing parameters, or initiating cleaning protocols.

In some embodiments, the foreign solutions comprise rinse water or cleaning chemicals.

In some embodiments, the information specific to a particular product includes at least beverage product identification information and the software based decision engine is configured to approve the beverage product identification information prior to activating the at least one pump.

In some embodiments, the container comprises a liquid-tight bag capable of holding a variety of consumable liquids.

Additionally disclosed is an ingredient bag for consumable liquids including a wirelessly readable information tag, the information tag configured to store encoded machine readable information specific to a particular beverage product and wirelessly engage a reader when located proximate the reader such that the reader can read the information stored on the information tag, wherein the information specific to the particular product comprises at least one of: product composition parameters, product handling parameters, production date parameters, product shelf life parameters, and product dispensing parameters.

In some embodiments, the information tag is one of an Radio Frequency Identification (RFID) tag, a Quick Response (QR) code, or a bar code and the reader is an Radio Frequency Identification (RFID) exciter, a Quick Response (QR) code scanner, a bar code scanner or a camera.

In some embodiments, the information tag is a Radio Frequency Identification (RFID) tag that is compliant with ISO/IEC Standard Number 15693.

In some embodiments, a coupler is included for connecting the bag to a pump, the coupler including a check valve and an elbow, the check valve configured to provide backflush prevention of foreign solutions into the container.

Additionally disclosed is a computer-implemented method for decision-making rule-based actions including the steps of wirelessly reading an information tag located on a container that is configured to store unique information specific to a particular product using a wireless exciter located proximate the container, performing a check for at least one of a product identity, product authenticity, and product origin associated with the particular product based on the unique information, updating parameters in a software inventory management system based on the results of the check, and determining based on the information read from the information tag whether a cleaning process should be executed on fluid conduits coupled to the container.

In some embodiments, the parameters include at least one of a product shelf life, a product production dates.

Some embodiments further include adjusting settings on a beverage dispensing system to coincide with product specific parameters based on the unique information and the settings include at least one of: a pump speed, a cleaning routine, and a flavor profile.

Some embodiments further comprise determining based on the information read from the information tag to prevent a beverage dispenser from outputting a beverage using the product stored within the container.

Some embodiments further comprise determining based on the information read from the information tag a recipe list to output to a user interface.

Some embodiments further comprise determining based on the information read from the information tag to prevent a beverage dispenser from outputting a beverage using the product stored within the container beyond a future date or time.

Some embodiments further comprise updating a block chain ledger associated with the product to indicate the coupling of the container to a beverage dispensing system.

DETAILED DESCRIPTION

Figure 1:
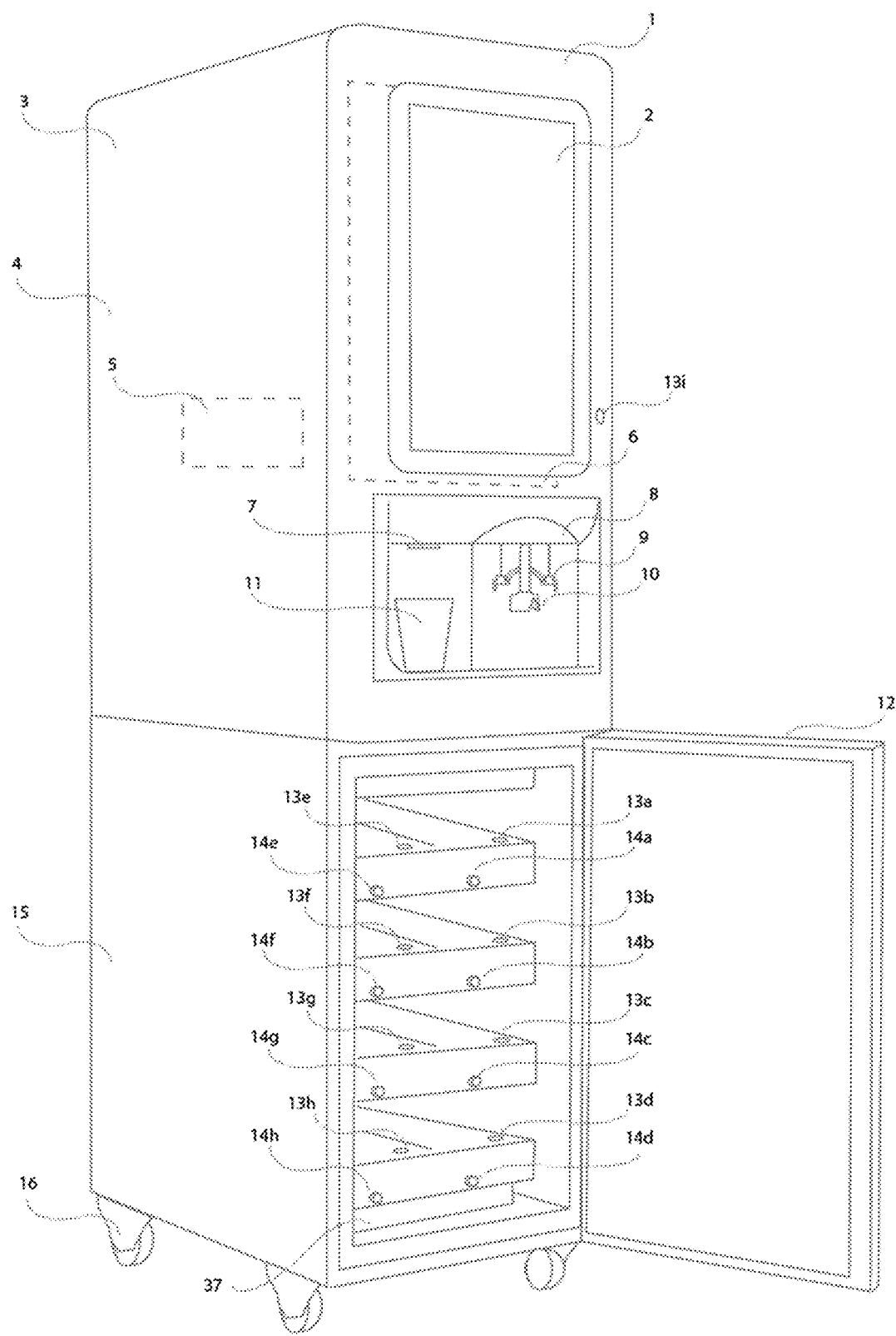
FIG. 1 is a perspective illustration of a beverage dispensing platform according to one embodiment.

Hereinafter, implementations of the present disclosure are described in detail with reference to the accompanying drawings. Detailed descriptions of well-known functions, configurations or constructions are omitted for brevity and clarity so as not to obscure the description with unnecessary detail.

The terminology used herein is for the purpose of describing particular implementations only and is not intended to be limiting. As used herein, the singular forms "a", "an" and "the" are intended to include the plural forms as well, unless the context clearly indicates otherwise.

Furthermore, the same reference numerals will be assigned to the same elements in the explanations of the figures, and explanations that duplicate one another will be omitted.

The invention is not limited in its application to the details of the constructions illustrated and the steps described herein. The systems and methods described herein are intended to ensure smart and safe inventory management of a blend-in-cup Beverage Dispensing System of the Related Applications, or the broad equivalent thereof.

The advantages and features of the present disclosure will become better understood with reference to the following more detailed description and claims, taken in conjunction with the accompanying drawings, in which like elements are identified with like numbers. The same reference numerals refer to the same parts throughout the various figures.

Figure 2:
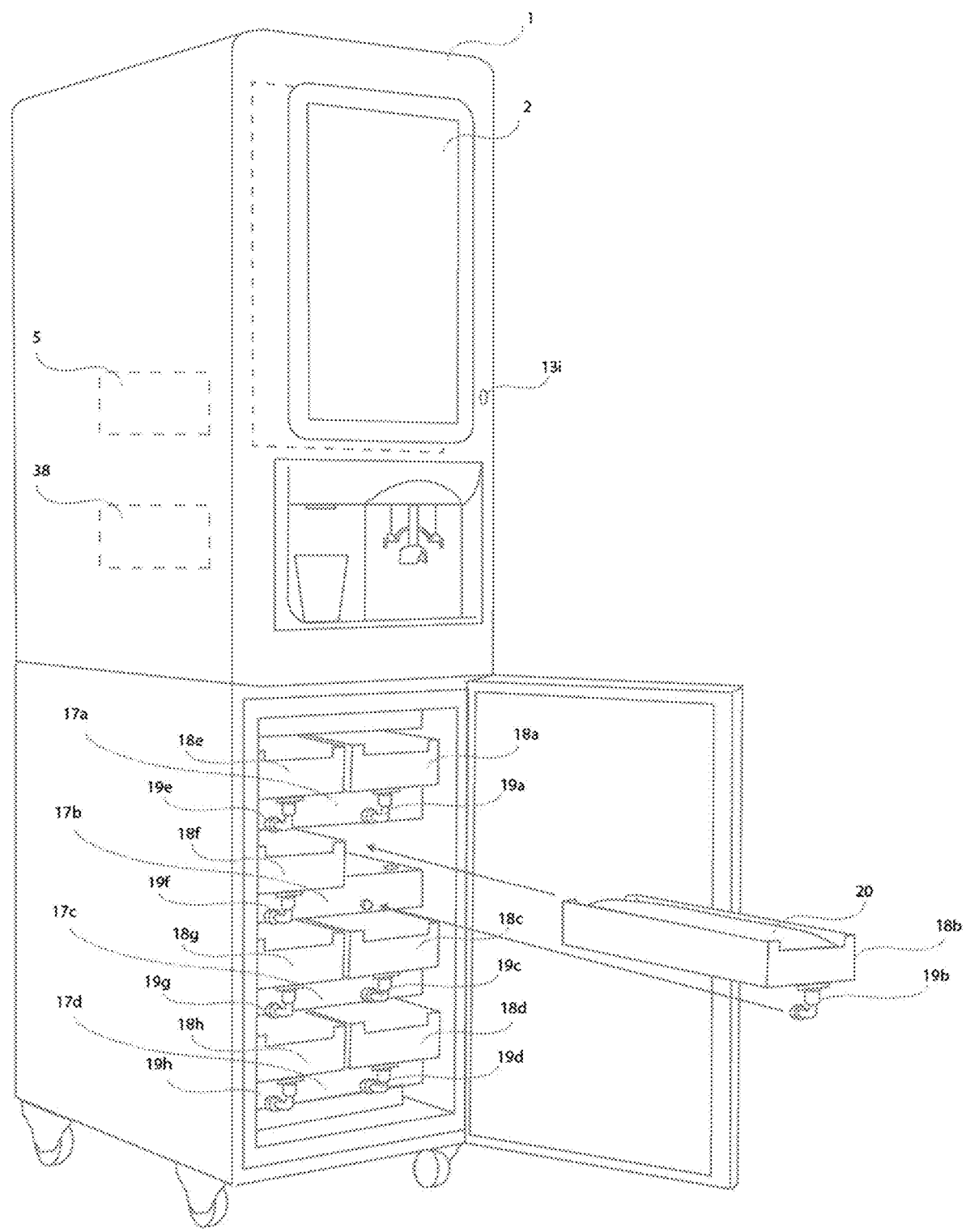
FIG. 2 is a perspective illustration of a beverage dispensing platform according to one embodiment.

FIG. 1 and FIG. 2 of the present disclosure include one embodiment of a beverage dispensing system embodying principles and concepts of the present disclosure. The beverage dispensing system 1 includes a plurality of components. According to one embodiment, within the system's housing are several components to deliver beverages in high volumes. Controller components manage onboard ice-making with an ice bin and there is at least one heat exchanger within the housing in thermal contact with the ice bin. The lower part of the housing contains a cabinet for refrigerated product storage (beverage syrups and concentrates filled in bags), internal pump systems for product, water and onboard sanitation chemicals and the advanced sanitation module.

As shown in FIG. 1, a beverage dispensing system 1 is provided. This includes a touch screen user interface 2, an integrated ice maker 3, internal components 4 (e.g., controls, water supply, electronics and condensers) and a main computer with operating system 6. The beverage dispensing system 1 may include integrated casters 16 for ease of movement. Beverage product is filled in bags 20 which are stored in tray bins 18 in a refrigerated cabinet 15 sealed by a cabinet door 12 to maintain the necessary temperature for storage. The product bags 20 are loaded with product (beverage concentrates, flavors and syrups), to be used in dispensed, frozen and blended beverages. The products may include various beverage concentrates, a dilutent such as water or carbonated water, and ice or another consumable medium. This system 1 pumps product from product bags 20 through tubes and lines to the product dispense nozzles 7.

A large touch-screen user interface 2 is attached to the front of the housing to operate the system. The user interface acts as digital merchandiser when the machine is in idle mode. Additionally, the user interface enables the end consumer to select beverages in various categories, flavors and serving sizes. The user interface also enables a professional operator to access operational systems and methods for service, inventory and maintenance and cleaning and sanitation procedures for food safety purposes.

The consumer may select from a variety of beverages which are managed by a software based cookbook with drink recipes, which is loaded to the operating system of the beverage dispensing system 1. These recipes utilize up to four or more individual flavors (from loaded bags with beverage concentrates or syrups), ice nuggets and water, carbonated water, or another base liquid.

When a user selects a drink, accurate and up to date allergen statements are displayed on the touch screen user interface 2. This ensures full transparency and food safety and improves the accuracy of food labels in general. This method is also advantageous as it offers reassurance to people with specific food allergies. The system provides additional protection against potential allergenic reactions of consumers, allergic to specific allergens by giving extra access to relevant information about the ingredients of the product. The system allows to provide necessary dietary, ingredient, nutritional and allergen information and display these to the operator of the machine. The whole supply chain from sourcing, manufacturing, distribution to storage can be tracked and displayed if required.

The product is thereafter dispensed into a cup 11 or other container. In order to properly blend or mix the beverage to the desired consistency, the cup is transported by an automated cup shuttle to the blend chamber, secured behind a splash guard shield 8. A customized cup holder 9 holds the cup during the blend sequence with a blend-in-cup blender shaft and blade 10 in the correct position and prevents cup tipping.

In traditional systems, loading new product bags into the refrigerated cabinet to replace empty, depleted or expired products requires, apart from the manual labor loading process, one to enter the correct and specific data about the loaded product to the inventory management screens on the machine. The described embodiment eliminates problems associated with the product loading process and reduces manual labor and avoids accidental user maloperation of the machine at the reloading process. Furthermore, the disclosed system enhances sanitation procedures, thus avoiding cross-contamination and usage or dispensing of wrong, bad or expired products into the cup.

Figure 4:
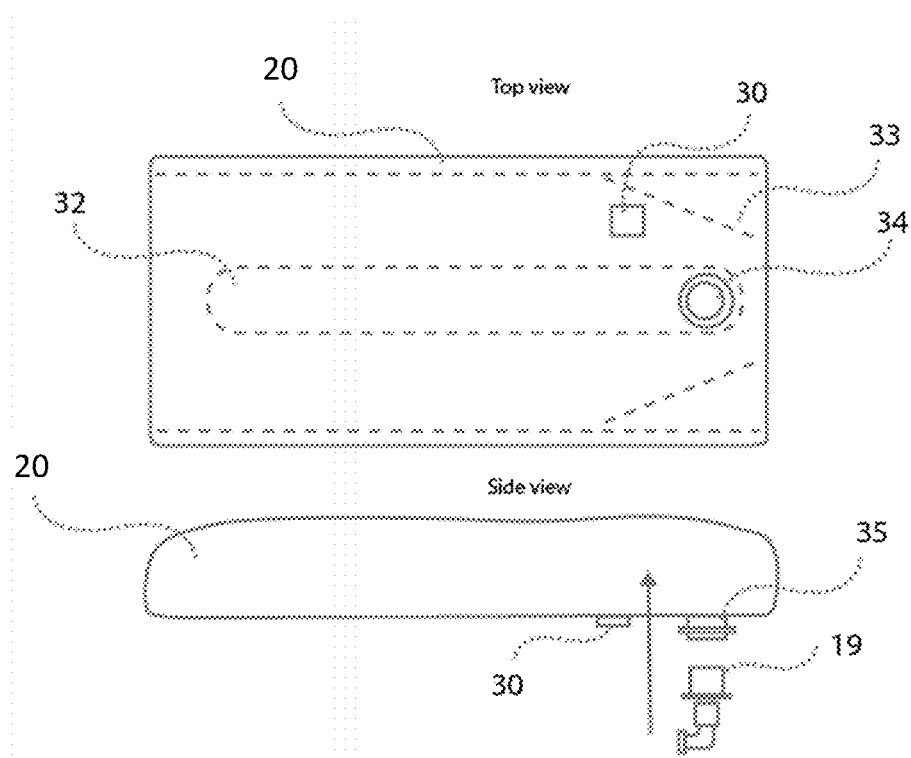
FIG. 4 is a bottom and side view of a product bag and attached RFID tag according to one embodiment.

In particular, each product bag 20 may be equipped with a Radio Frequency IDentification (RFID) tag 30 (as shown in FIG. 4), which is attached to the bag during production. Each product bag 20 comes with a predefined and preprogrammed dataset on the RFID tag 30 which includes all relevant data and algorithms associated with the particular product contained in the product bag. This data may include, for example, the flavor identity, content, production date, shelf life, and pump motor parameters on how to dispense the product due to varying viscosities, in addition to other product composition parameters, product handling parameters, production date parameters, product shelf life parameters, and product dispensing parameters. The RFID tag may also store and provide promotional information to run special offers for the specific flavor and specific recipes, utilizing the flavor. These offers, promotions or discounts then will be prominently displayed on the touch screen user interface 2 of the system 1.

The RFID tags 30 are managed by an RFID control board 5 with a decision engine. The control board is operatively coupled to an RFID tag reader, such as an RFID antenna 13. The RFID control board 5 is connected to the main computer with operating system 6. The system's positioning of the RFID antennas 13 and their specific locations proximate to the RFID tags 30 on the bags 20 when the bags 20 are loaded to the system is advantageous. In particular, this placement avoids incorrect loading of product in a slot designated for a different product and eliminates operational errors with the inventory management. The distance between the antenna 13 and tag 30 additionally avoids interference between the individual slots and individual product bags 20. In exemplary embodiments, the distance between the antenna 13 and tag 30 may be up to approximately ⅛ of one inch, ¼ of one inch, ½ of one inch, up to one inch, or up to three inches. In other embodiments, the distance between the antenna 13 and tag 30 may be up to 3 feet.

FIG. 2 shows the opened cabinet of the system 1. RFID antennas 13 may be placed on top of pump housings 17 and, as described above, are designed to read information from RFID tags 30 that are attached to product bags 20. The RFID antennas 13 are located in a vertical plane in the proximity of the product bag 20 above the pump housings 17. The antenna 13 is operatively coupled with respect to the tag 30 for communicating with the tag and for communicating with the RFID control board 5 which communicates with the main computer with operating system 6.

In one embodiment, the RFID antennas 13 and tags 30 communicate according to the methods described in ISO/IEC 15693 "Identification cards—Contactless integrated circuit cards—Vicinity cards." Communication according to this standard utilizes 13.56 MHz RFID read/write operations, and is advantageous because it provides for the ability to perform accurate read/write operations through various mediums, including water and plastic. ISO/IEC 15693 certified tags are individually numbered, which allows for the ability to individually track each product bag in the system. The tags also have anti-collision identification protocols within allowing multiple tags to be read simultaneously. In one embodiment, the tags are passive tags, in that the tags do not have a battery source. Passive tags are advantageous because the tag has a very long shelf-life. The RFID tag 30 is powered by the RFID antenna 13 at the tray bin. In other embodiments, active (battery-powered) tags may be used.

In other embodiments, the RFID tag may be replaced by a Quick Response (QR) Code, a barcode, or any other wirelessly readable identification marker. Similarly, the RFID antenna may be replaced with a QR Code scanner, barcode scanner, camera, or any other type of technology capable of reading the identification marker.

Additionally shown in FIG. 2 are the plurality of pump housings 17 which are communicably connected to tray bins 18 using respective integrity-gate-elbows 19 with back-flow prevention check valves 22. In the exemplary system shown in FIG. 2, there are four pump housings, with two product pumps each, therefore eight slots can be loaded with a maximum of eight products. Each of these four pump housing has two slots with a pump connector and an RFID antenna 13, resulting in a total of eight pump connectors and eight RFID antennas 13 for a maximum of eight product bags 20. A pump control board 38 communicates with product pump motors 29. When a flavor is replaced, in order to avoid cross-contamination between the old and new product, the system enables the internal sanitation module to enforce product related cleaning protocols to flush, rinse and sanitize all product lines and pumps automatically. As shown in FIGS. 1-2, the internal sanitation module, located at the bottom of the cabinet, holds water and sanitation chemicals for an integrated clean-in-place system. In alternate embodiments, cleaning and sanitation chemicals can also be provided from an external container, connected to the machine through a hose, depending on the configuration of the machine. The product bags can stay loaded inside the machine during the various automated clean and sanitize protocols, as the check-valve of the integrity-gate-elbow prevents backflush of sanitation chemicals into the product storage. The integrity-gate-elbow allows the beverage dispensing platform to run an automated self-cleaning process without detaching the product bag or unloading the tray bin from the refrigerated cabinet. This maintains product integrity and fulfills the highest food safety requirements.

Figure 3:
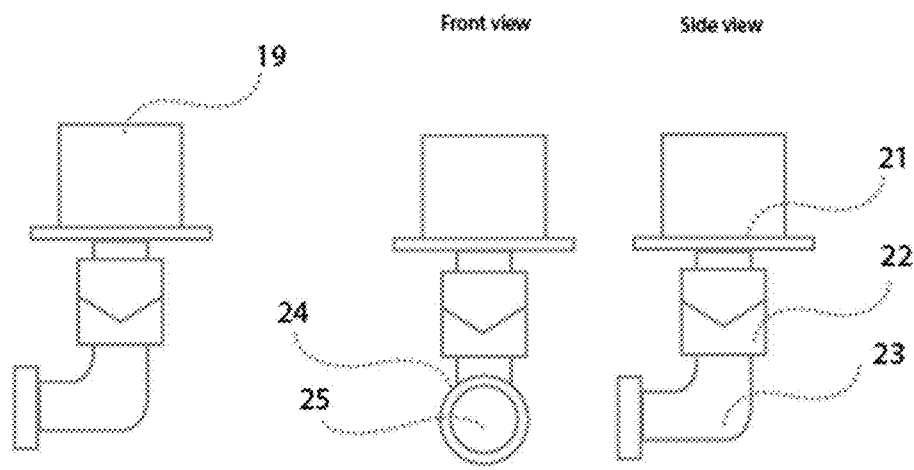
FIG. 3 is an illustration of an integrity-gate-elbow according to one embodiment.

FIG. 3 shows a detailed view of the integrity-gate-elbow 19. The integrity-gate-elbow 19 includes a back-flow prevention check valve 22, a spout fitment ring 21 to connect to the bag (not shown), a pump connector alignment ring 24, and an outlet 25 for connection to the pump housings 17. The back-flow prevention check valve 22 ensures that the product is dispensed in one direction only, through a product line 23.

As shown in FIG. 4, the integrity-gate-elbow 19 with check-valve 22 is attached to the product bag 20 at the suction port 34 of the product bag, thus connecting the bag 20 to the pump connector of the pump housing. In alternate embodiments, the check-valve also can be integrated in or at the pump housing between the pump connector and the product pump if an elbow without integrated check-valve is being used on the bag. The bag 20 additionally incorporates a dip strip 32. The dip strip 32 may be a rigid, rectangular evacuation assistance device, which allows for convenient dispensing of both traditional post-mix syrup and difficult to evacuate pulpy juice or highly viscous liquids. In proximity to the spout outlet 35 there is a suction port fitment 34 and delta seals 33 for optimized evacuation of the product. FIG. 4 also shows an exemplary placement of an RFID tag 30 on the product bag 20.

Figure 5:
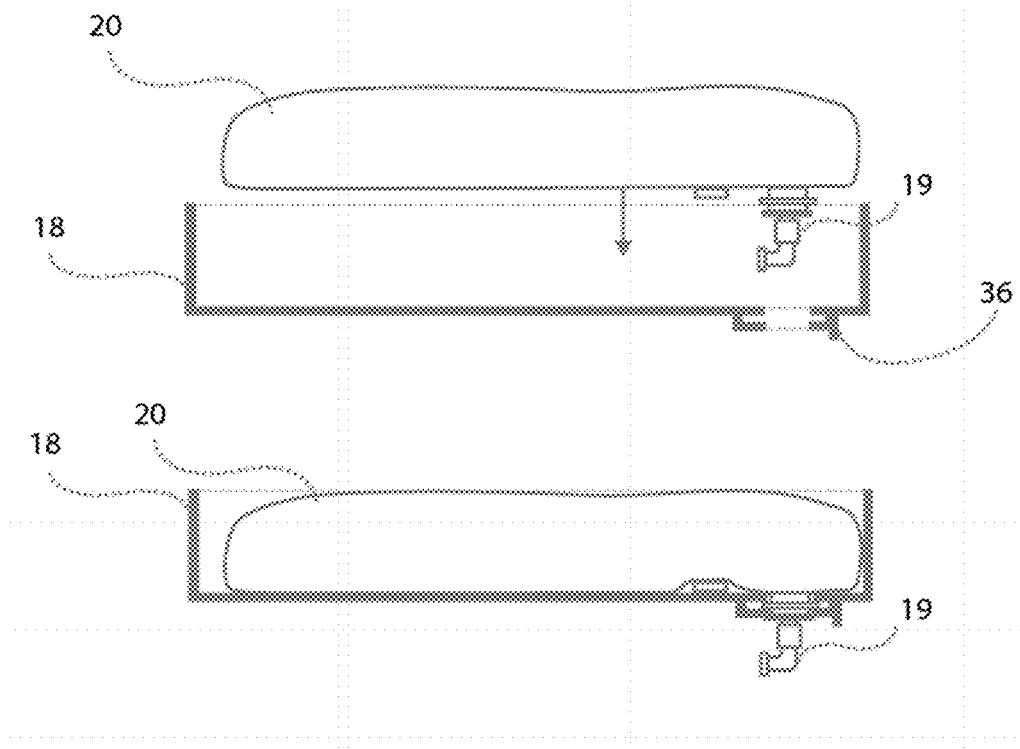
FIG. 5 is a side view of a RFID enabled product bag and the tray bin according to one embodiment.

FIG. 5 shows an exemplary illustration of a product bag 20 inserted into a tray bin 18 according to one embodiment. The integrity-gate-elbow 19 is aligned such that it cooperates with the snap-in fitment 36 of the tray bin 18 upon insertion of the bag 20 into the bin 18. After this procedure the bag and bin are ready to be securely loaded into the beverage dispensing system 1.

Figure 6:
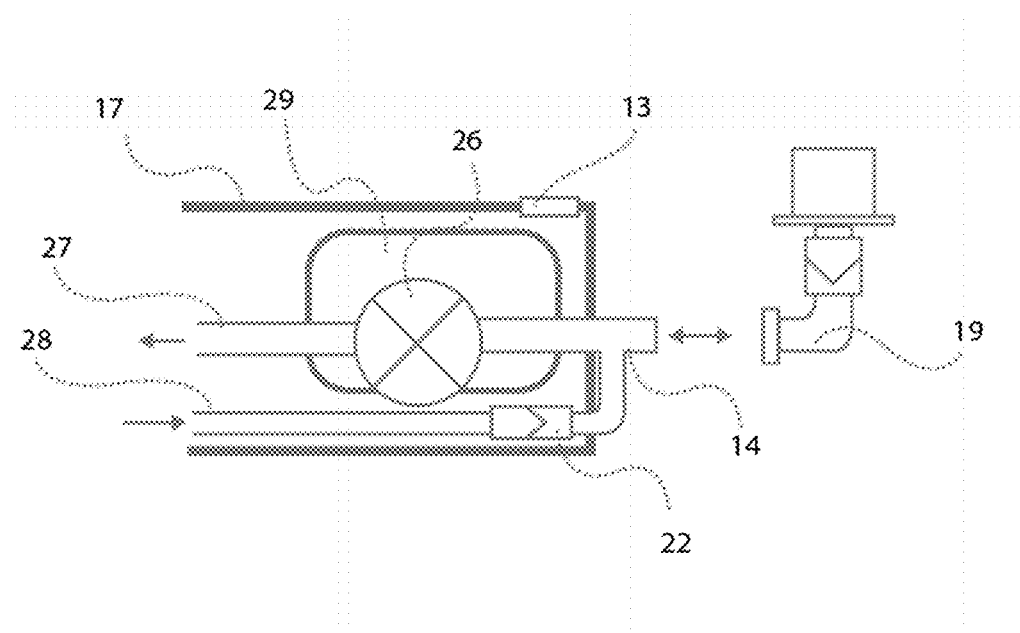
FIG. 6 is an illustration of an integrity-gate-elbow connection to a beverage dispensing system according to one embodiment.

FIG. 6 shows an exemplary embodiment of how a tray bin 18, loaded with a product bag 20, is connected to a pump housing 17 with an RFID antenna 13 on top of the housing. Each of the four housings holds two pump motors 29, one for each of the eight product slots, which each house one tray bin 18. Once a bag 20 is connected through the elbow 19 to the pump connector 14, the pump motor drives the pump rotor 26 to pump product out of the bag into the product outlet line 27 towards the dispense nozzles 7 to dispense product into a cup 11. The water inlet line 28 both supplies water and cleaning chemicals from the sanitation module. The check valve 22 prevents product from the bag from entering the inlet line 28.

Figure 7:
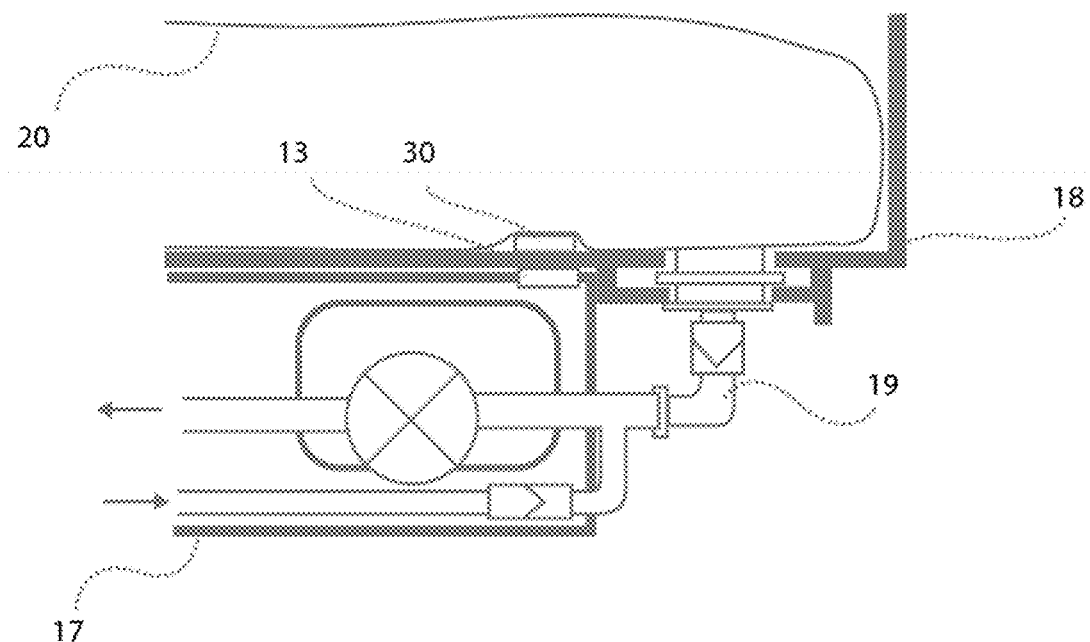
FIG. 7 is an illustration of an integrity-gate-elbow connection to an RFID enabled product bag and beverage dispensing system according to one embodiment.

FIG. 7 shows an exemplary embodiment of a successful connection between a tray bin 18, loaded with a product bag 20, and the pump connector 14, mounted on the pump housing 17. In this final position, the RFID antenna 13 can establish a connection to the RFID tag 30 on the bag and is able to read the information from the RFID tag in the necessary position. The RFID connection can be established only when the antenna and tag are proximate, thus allowing the antenna to read the information from the tag and to transmit it to the RFID control board 5.

Figure 8:
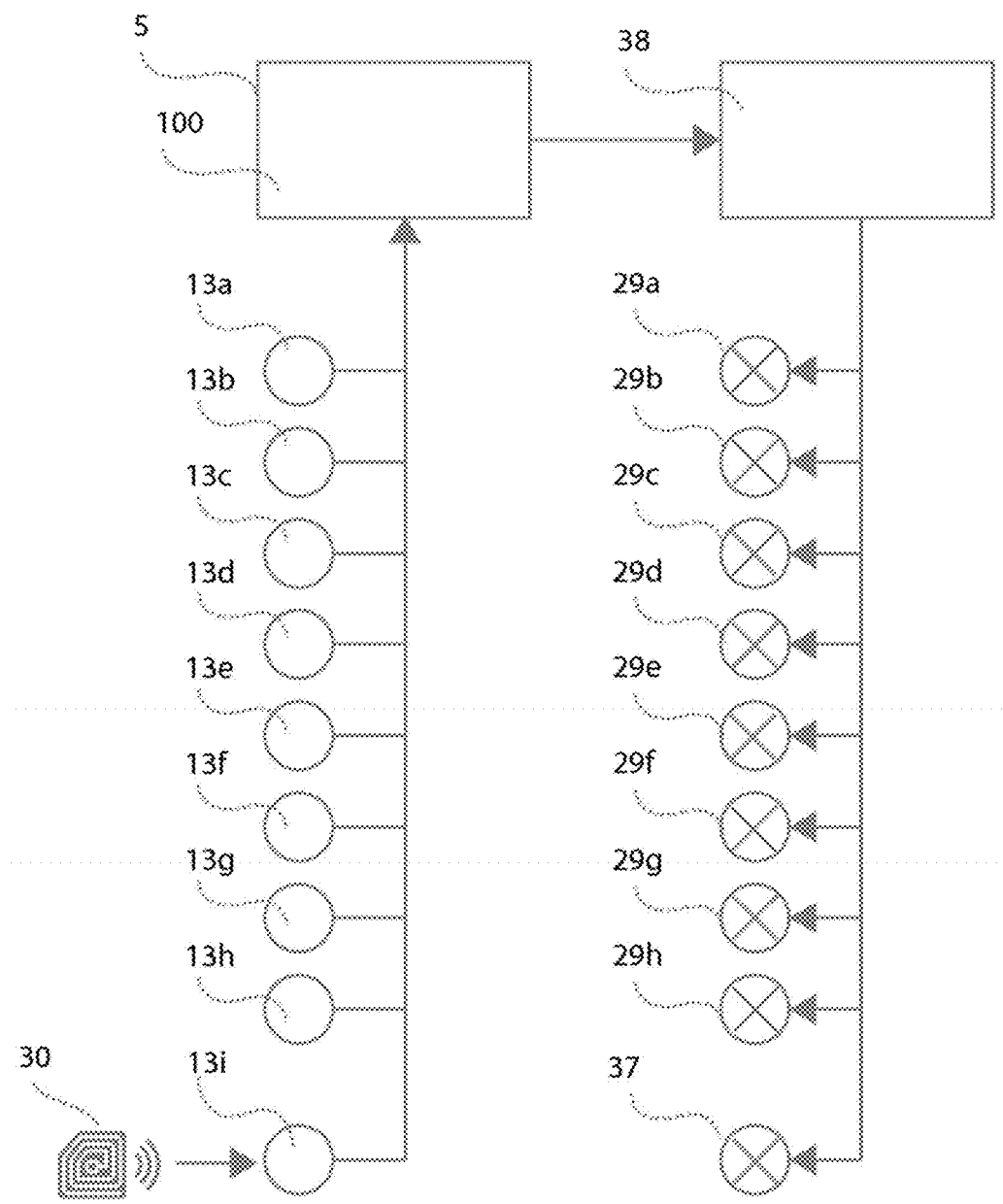
FIG. 8 is an RFID control board schematic with a software decision engine according to one embodiment.

FIG. 8 shows an exemplary illustration of the connection network between the RFID antennas 13. The antennas 13 receive a signal from an RFID tag 30 on a bag and transmit this information to the RFID control board 5.

A decision engine 100 is hosted on the RFID control board 5 and communicates with the pump control board 38 to activate and deactivate pumps 29, 37 for product, water or sanitation chemicals. The software based decision engine 100 is advantageous for many reasons. For instance, the internal inventory management can be updated based on data retrieved from the RFID card with correct product ID and shelf life to set correct expiration dates in order to prevent dispensing of expired or bad products into the cup. If a new flavor is inserted to one of the slots, the system enables the machine to select a specific cookbook with a different set of recipes incorporating the new flavor. This prevents dispensing of wrong product or dispensing a wrong recipe.

Additionally, the system's decision engine will check for product identity, authenticity and origin, shelf life and production dates for the inventory management, set product specific parameters like pump speeds and initiate cleaning algorithms if necessary to maintain food safety and prevent cross-contamination if a new flavor is loaded to the slot which was loaded with a different flavor before. The system prevents and disables the accidental usage of expired, wrong, non-authorized, non-approved and non-validated products to avoid technical maloperation of the machine and dispensing of incorrect or faulty drinks.

Figure 9:
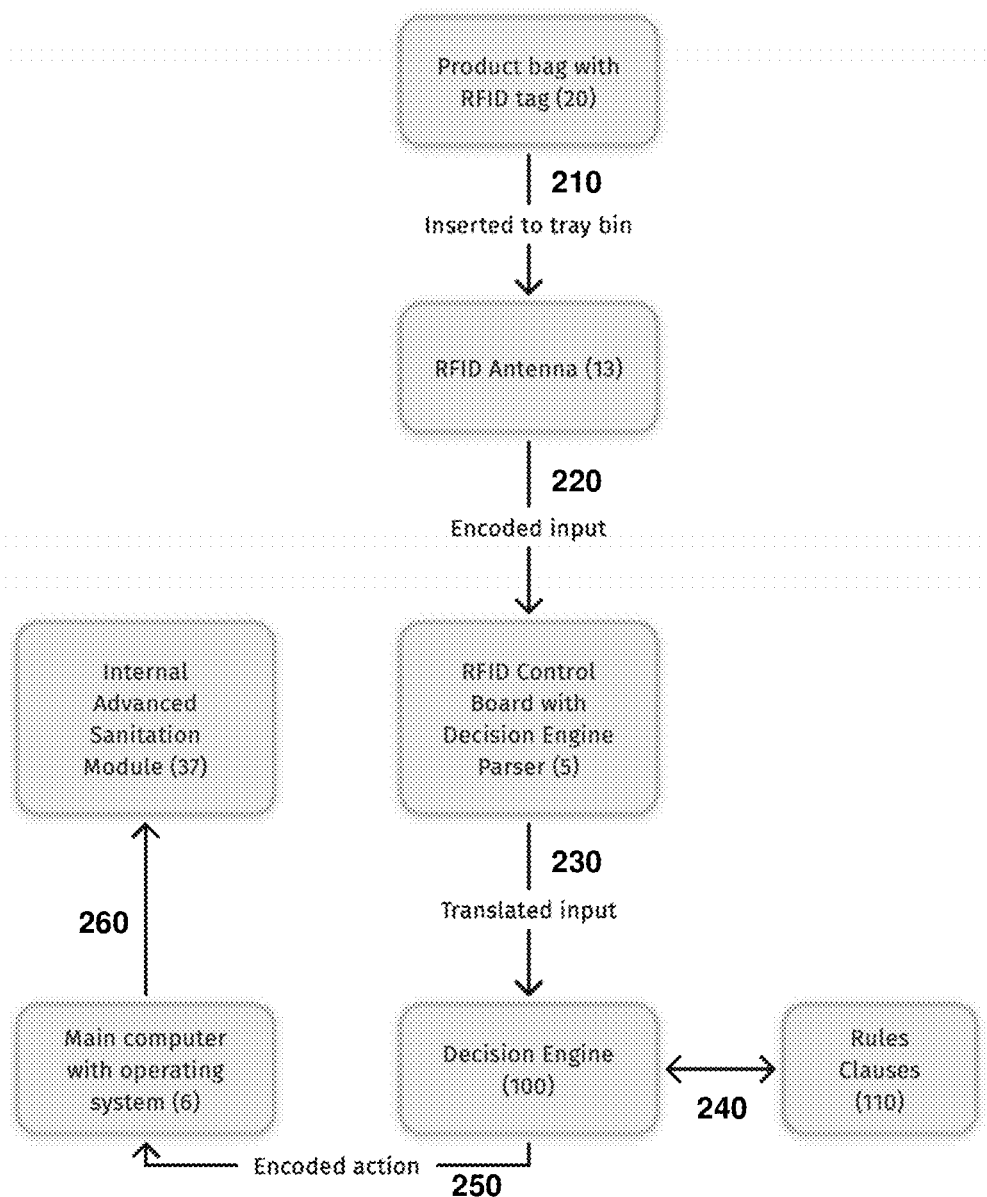
FIG. 9 is a process flow chart for processes of an RFID control board and decision engine according to one embodiment.

FIG. 9 shows a process flow chart describing the main components and processes of the RFID control board and decision engine 100. The RFID control board 5 with decision engine receives encoded information from the RFID antenna 13 after a product has been inserted into a tray bin 18. This information is parsed and sent to the software decision engine 100. Based on predefined rules 110 the decision engine prepares encoded actions and sends the actions to the main computer with operating system 6. In particular, as shown in FIG. 9, at step 210, the product bag 20 is inserted into a tray bin 18. Once inserted, the RFID tag 30 comes in close proximity with an antenna 13 that is connected to the RFID control board 5. At step 220, the encoded input stored in the RFID tag 30 is read by the antenna 13 and sent to the RFID control board 5. Once received by the RFID control board 5, the encoded input is parsed, and in step 230, the translated input is sent to the decision engine 100. At step 240, the decision engine 100 references predefined rules 110 in order to determine the necessary action based on the information received at step 230. In step 250, the decision engine 100 sends an encoded action to the main computer with operating system 6. At step 260, the main computer with operating system 6 subsequently performs the necessary actions, which may include performing an advanced sanitation routine via sanitation pump 37, as shown in FIG. 9. Additional actions may include adjusting inventory or parameters associated with the product information received via the RFID tag 30.

Figure 10:
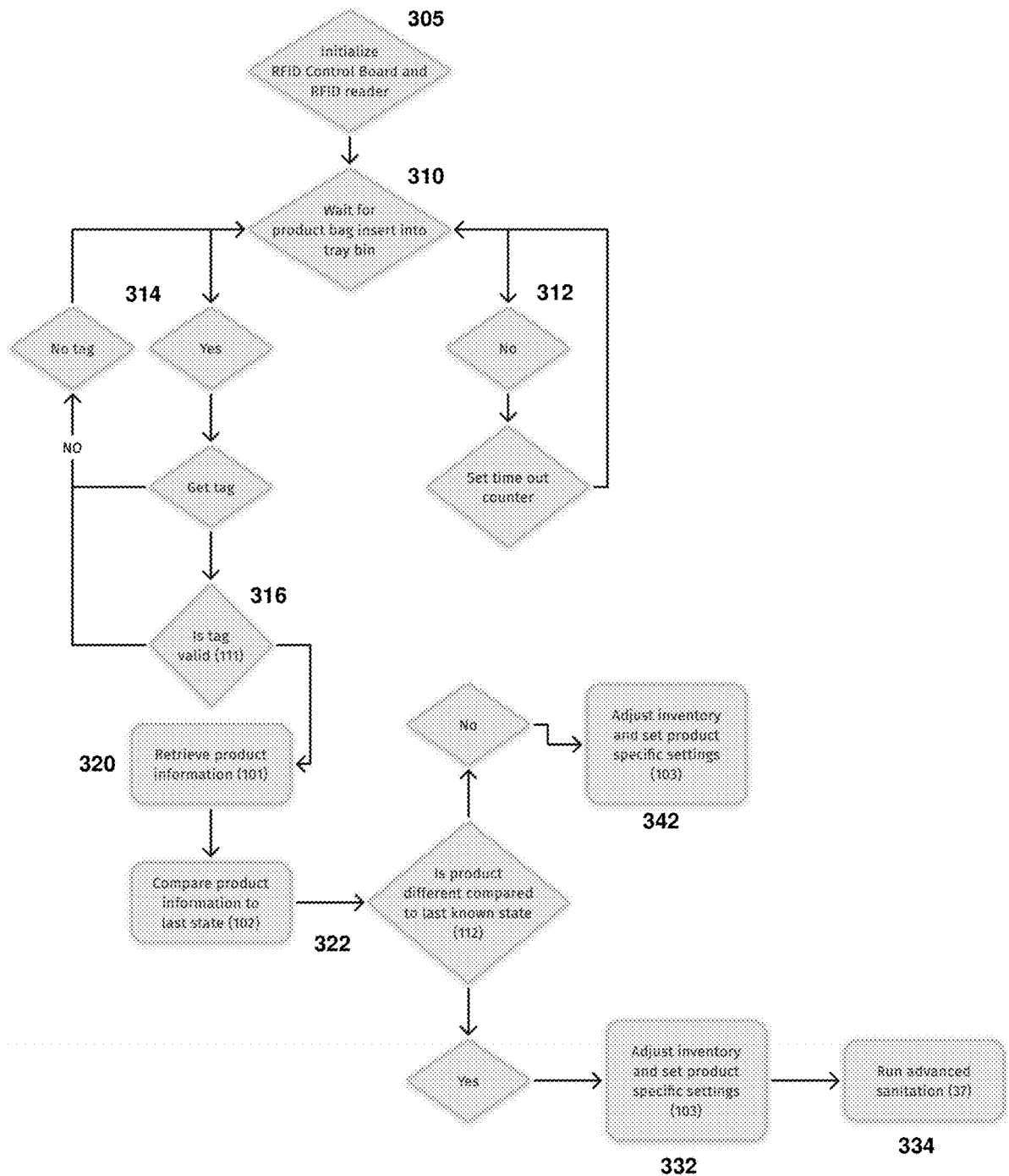
FIG. 10 is a process flow chart for reading of an RFID tag and translating stored information into actions using a decision engine according to one embodiment.

FIG. 10 shows a process flow chart describing the reading of an RFID tag and translating the stored information into actions using the decision engine. In particular, as shown in FIG. 10, at step 305, the RFID control board 5 and RFID reader and antenna 13 are initialized for use with the beverage system. Once the initialization process is complete, at step 310, the system enters the state of waiting for a product bag 20 to be inserted into a tray bin 18. While in this state, the system is constantly checking whether or not a product bag has been inserted into a tray bin 18. As shown in loop 312, if the system does not detect a product bag 20 in the tray bin 18, the system will set a time out counter, during which time it will delay checking for a product bag 20 in the tray bin 18. The time out counter can be programmed to any predefined or variable timeframe. Once the time out counter has elapsed, the system again checks to see whether a product bag is present in tray bin 18. In the event that a product bag is detected, the system enters loop 314, during which the system attempts to get or read information from tag 30. If no tag is detected, loop 314 returns to again check whether a product bag 20 is present in bin tray 18. In the event that a tag 30 is detected, the system moves to step 316 and attempts to determine whether or not the tag is a valid tag. Once the system determines whether or not the tag is valid, at step 320, the product information 101 is read by the antenna 13 and passed to the RFID control board 5. The product information 101 may include any of a flavor identity, content, production date, shelf life, and pump motor parameters on how to dispense the product due to varying viscosities, in addition to other product composition parameters, product handling parameters, production date parameters, product shelf life parameters, and product dispensing parameters. At step 322, this information is then compared with the previous state's product information 102. If the product information 101 differs from the previous state product information 102, then at step 332, the inventory is adjusted to accommodate the new product information and settings 103 associated with product information 101. Once this adjustment is made, a sanitation procedure is run in step 334. If the product information 101 is the same as the previous state product information 102, then the inventory information is adjusted to accommodate the new amount of product at step 342, but the type of product may not need to be adjusted. In this case, no enhanced sanitation procedure is necessary.

Additionally, the system's decision engine is capable of verifying the product identity, authenticity and provenance by scanning the RFID tag and communicating to a blockchain ledger. A smart contract is executed and then multiple trusted nodes verify the information is correct before it is written back to the blockchain ledger. Each entry in the blockchain ledger is cryptographically signed and encrypted which deters fraud and reduces the chance of hacking. Since the entire supply chain process becomes transparent by scanning the product bag RFID tags and adding data while historical state data remains in previous blocks, it becomes possible to quickly and inexpensively validate product provenance. Any product that doesn't pass authenticity then becomes suspect and locks the machine from using this product to avoid malfunction, maloperation or cross-contamination and enforce cleaning and sanitation processes if required by the blockchain ledger. Dairy containing products require specific cleaning protocols, other than non-dairy products, not only because of potential allergen aspects but also due to different shelf-life and handling specifications. All product bags with RFID tag will provide their own and specific cleaning protocols to the machine. The ledger provides comprehensive and seamless documentation cleaning and protocols to track food-safety and regulatory requirements.

Once a product bag has been inserted into the tray bin 18, the encoded information from the RFID tag 30 will be read through the RFID antenna 13 and passed to the software decision engine 100. The retrieved information 101 contains a smart contract which will be uploaded to the blockchain, executed and compared to the information that has been previously recorded on the blockchain that can persist throughout the entire product supply chain (e.g., from farm to cup). Use of a blockchain is advantageous because it provides additional proof of product purity and origin, as well as the accuracy of ingredient and allergen listings.

Figure 11:
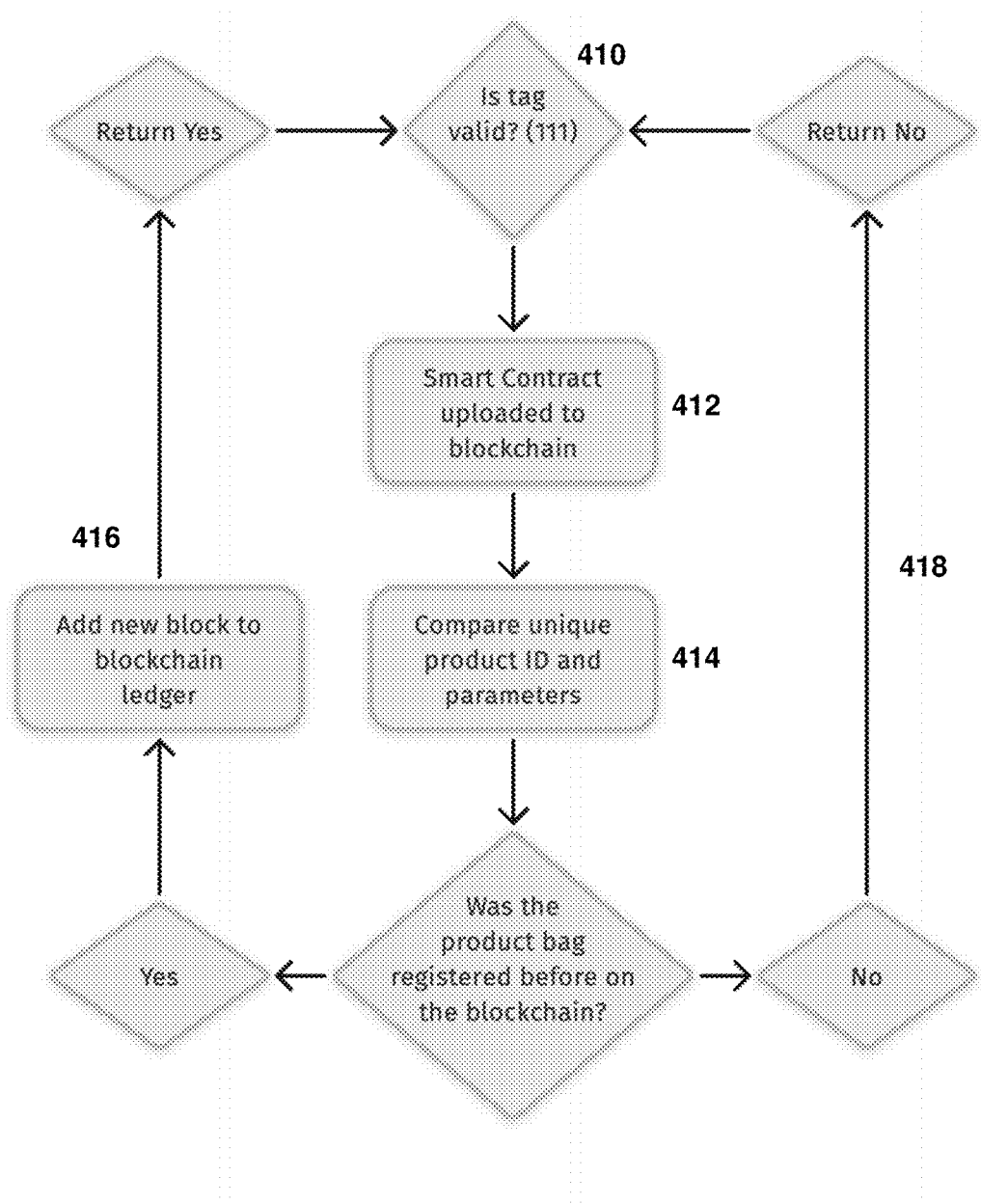
FIG. 11 is a process flow chart for product verification using a blockchain ledger according to one embodiment.

Specifically, as shown in FIG. 11, The software decision engine 100 at step 410 will first check the tag information for product fraud 111. This is done by uploading the smart contract to blockchain at step 412, after which at step 414, the information is compared using the unique product code, production date, shelf life and pump motor parameters against a database blockchain ledger inside the decision engine 100 or a separate verification process operating remotely, for example, in the cloud. If the product bag had been previously registered on the blockchain, at step 416 a new block is added to the blockchain ledger and the loop returns an indication that the tag is valid. If the product bag had not been previously registered on the blockchain, at step 418, the loop returns an indication that the tag is invalid.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A smart inventory management system for a dispensing and blend-in-cup beverage platform comprising:

at least one container having an information tag that is configured to store unique information specific to a particular product;
a reader located proximate the container, the reader configured to read the stored information from the information tag;
a control board configured to host a software based decision engine, the software based decision engine configured to interpret the information specific to a particular product and to control one or more system components based at least in part on the information;
at least one of pump controlled by the control board and configured to pump beverage concentrates out of the containers in order to dispense the beverage concentrate into a beverage holder based on the information stored on the information tag; and
at least one check valve located between an opening on the container and the pump, the check valve configured to provide backflush prevention of foreign solutions into the container,
wherein the information specific to a particular product comprises allergen related information specific to the particular product, and
wherein the control of one or more system components comprises initiating cleaning protocols based on the allergen related information.

2. The system of claim 1, wherein the information specific to a particular product further comprises at least one of: beverage product composition parameters, beverage product handling parameters, beverage production date parameters, beverage product shelf life parameters, and beverage product dispensing parameters.

3. The system of claim 1, wherein the information tag is one of a Radio Frequency Identification (RFID) tag, a Quick Response (QR) code, or a bar code and the wireless exciter is an Radio Frequency Identification (RFID) exciter, a Quick Response (QR) code scanner, a bar code scanner, or a camera.

4. The system of claim 1, wherein the control of one or more system components further comprises at least one of: managing system inventory, adjusting pump parameters, or adjusting dispensing parameters.

5. The system of claim 1, wherein the foreign solutions comprise rinse water or cleaning chemicals.

6. The system of claim 1, wherein the information specific to a particular product includes at least beverage product identification information; and
wherein the software based decision engine is configured to approve the beverage product identification information prior to activating the at least one pump.

7. The system of claim 1, wherein the container comprises a liquid-tight bag capable of holding a variety of consumable liquids.

8. A computer-implemented method for decision-making rule-based actions compromising:
wirelessly reading an information tag located on a container that is configured to store unique information specific to a particular product using a wireless exciter located proximate the container;
performing a check for at least one of a product identity, product authenticity, and product origin associated with the particular product based on the unique information;
updating parameters in a software inventory management system based on the results of the check; and
determining based on the information read from the information tag whether a cleaning process should be executed on fluid conduits coupled to the container,
wherein the unique information specific to a particular product comprises allergen related information specific to the particular product, and
wherein the cleaning process is based on the allergen related information.

9. The method of claim 8, wherein the parameters include at least one of a product shelf life, a product production dates.

10. The method of claim 8, further including adjusting settings on a beverage dispensing system to coincide with product specific parameters based on the unique information.

11. The method of claim 10, wherein the settings include at least one of: a pump speed, a cleaning routine, and a flavor profile.

12. The method of claim 8, further comprising determining based on the information read from the information tag to prevent a beverage dispenser from outputting a beverage using the product stored within the container.

13. The method of claim 8, further comprising determining based on the information read from the information tag a recipe list to output to a user interface.

14. The method of claim 8, further comprising determining based on the information read from the information tag to prevent a beverage dispenser from outputting a beverage using the product stored within the container beyond a future date or time.

15. The method of claim 8, further comprising updating a block chain ledger associated with the product to indicate the coupling of the container to a beverage dispensing system.

* * * * *